US012182598B1

(12) United States Patent
Johnson

(10) Patent No.: US 12,182,598 B1
(45) Date of Patent: Dec. 31, 2024

(54) MACHINE CONTROLLER AS A SERVICE

(71) Applicant: Amazon Technologies, Inc., Seattle, WA (US)

(72) Inventor: Chase Johnson, Maida Vale (GB)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 16/891,612

(22) Filed: Jun. 3, 2020

(51) Int. Cl.
*G06F 9/455* (2018.01)
*G06F 8/61* (2018.01)

(52) U.S. Cl.
CPC ............ *G06F 9/45558* (2013.01); *G06F 8/63* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 2015/0095788 | A1* | 4/2015 | Thiele | H04L 41/0897 715/735 |
| 2015/0248506 | A1* | 9/2015 | Hartley | G05B 19/41815 703/21 |
| 2016/0197778 | A1* | 7/2016 | Jones | G06F 16/951 709/222 |
| 2019/0265668 | A1* | 8/2019 | Kuya | G05B 19/05 |
| 2019/0317465 | A1* | 10/2019 | Wei | G06F 21/53 |
| 2019/0327144 | A1* | 10/2019 | Tembey | G06F 9/45558 |
| 2019/0334909 | A1* | 10/2019 | Schmitt | G06F 9/5072 |

OTHER PUBLICATIONS

1. Givehchi et al., Control-as-a-Service from the Cloud: A Case Study for using Virtualized PLCs. May 2014, 2014 10th IEEE Workshop on Factory Communication Systems (WFCS 2014), pp. 1-4 (Year: 2014).*

* cited by examiner

*Primary Examiner* — Lewis A Bullock, Jr.
*Assistant Examiner* — Melissa A Headly
(74) *Attorney, Agent, or Firm* — Lee & Hayes, P.C.

(57) ABSTRACT

A virtual machine controller service of a service provider network may provide a virtual machine controller environment where applications associated with machine controllers (e.g., programmable logic controllers (PLCs), programmable automation controllers (PACs), etc.) can execute and data can be provided as input to the executing applications. An example process may include receiving a request to create a virtual controller instance, and creating the virtual controller instance in a service provider network based at least in part on the request. The example process may further include executing, on the virtual controller instance, an application that is associated with a machine controller that is operable within a facility, and sending data as input to the application to elicit a response from the application. This example process can be used for training personnel and/or for validating machine controller applications prior to their deployment on a physical machine controller in a facility.

20 Claims, 10 Drawing Sheets

MACHINE CONTROLLER AS A SERVICE

BACKGROUND

In materials handling facilities, various electromechanical systems may be utilized to help automate certain tasks, such as picking and placing items, sorting and packaging items, and labeling boxes for shipment, among other tasks. These automated systems may be controlled by different types of programmable logic controllers (PLCs), programmable automation controllers (PACs), and/or similar machine controllers. A machine controller, such as a PLC or a PAC, is a computing device (a physical piece of hardware) that executes an application (software) to control various aspects of an electromechanical system. There may be numerous machine controllers that are used to control various types of automated systems within a single facility. A facilities operator may operate multiple such facilities across different geographic regions, and, as a result, may have to manage many thousands of machine controllers at a given time. Since testing a machine controllers is often labor intensive, it can be quite difficult for such a facilities operator to manage a high number of geographically-dispersed machine controllers. A machine controllers is oftentimes tested in a live production environment on-site at a facility, which causes a loss of production output in the facility while failure conditions are tested for the machine controller. Furthermore, the cost of hiring and managing a large workforce of control systems engineers to manage a correspondingly-large number of machine controllers residing at numerous facilities may be impracticable for some facilities operators. Furthermore, because machine controllers are typically used to control expensive machinery (e.g., multimillion dollar robots), a facilities operator cannot feasibly build replicas of such machinery offsite for testing or training purposes.

The disclosure made herein is presented with respect to these and other considerations.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
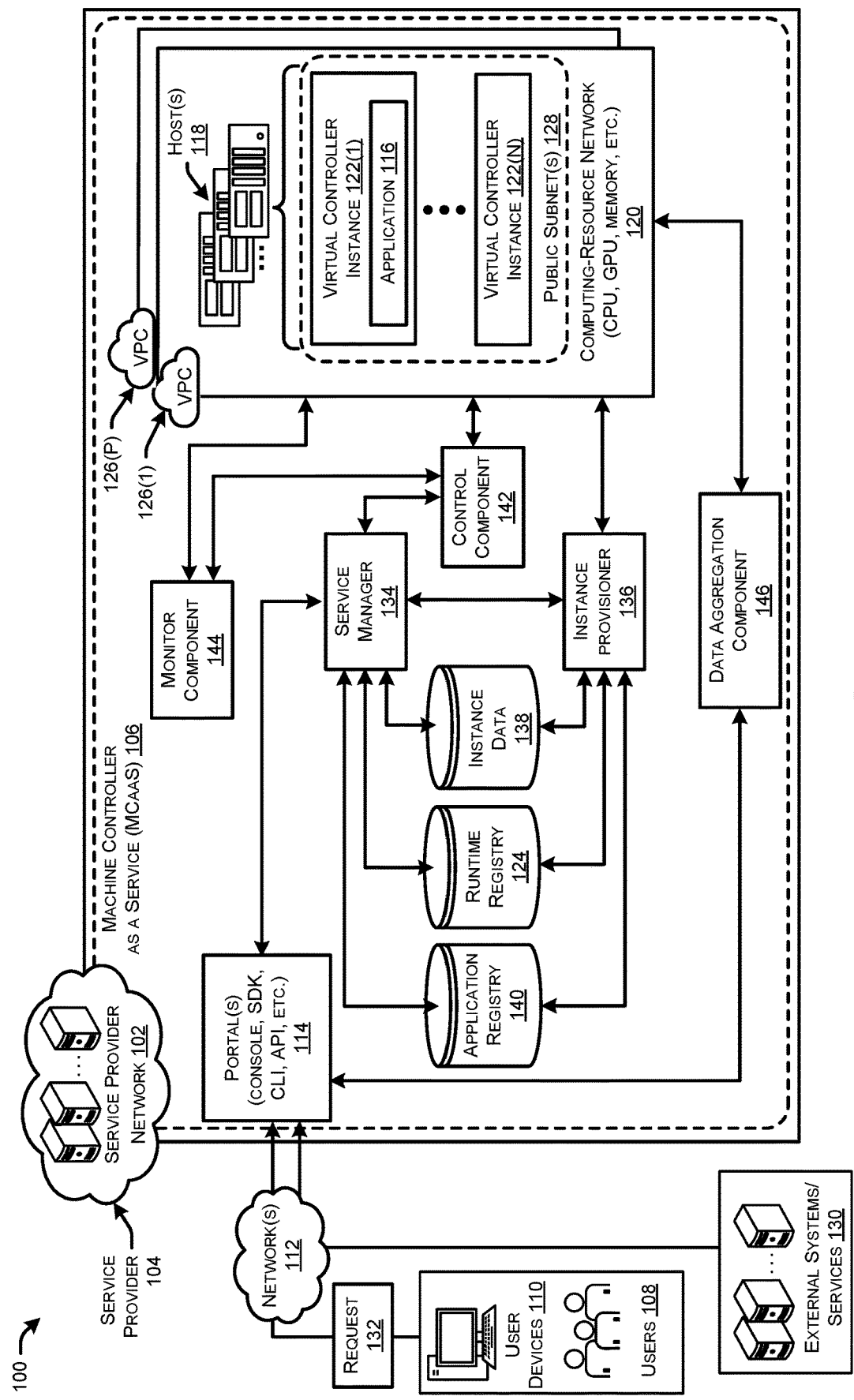
FIG. 1 illustrates a system-architecture diagram of an example environment in which a virtual machine controller environment can be implemented.

Programmable logic controllers (PLCs), programmable automation controllers (PACs), and/or similar machine controllers are used in various facilities to control electromechanical systems for automating tasks. For example, in a fulfillment center, a PLC may be used to control a sorting machine that sorts items. Another PLC in the same fulfillment center may be used to control a robotic arm that picks and/or places items on a conveyor. In general, machine controllers can be used in a variety of industrial settings including, without limitation, manufacturing processes, assembly lines, food processing plants, and other types of facilities where automation is useful. A facilities operator may operate multiple geographically-dispersed facilities, each facility employing potentially numerous machine controllers of varying types to control electromechanical systems in the facility. Using conventional approaches, a facilities operator may find it challenging to manage the numerous machine controllers under its supervision.

This disclosure describes, among other things, techniques and systems for implementing a virtual machine controller environment as a network-based service (sometimes referred to herein as "machine controller as a service (MCaaS)," or a "virtual machine controller service"). The virtual machine controller environment allows users and/or computer programs to create, within a service provider network, virtual controller instances that are used to execute applications for specific machine controllers. An individual virtual controller instance may comprise a standardized unit of software for executing one or more applications in the service provider network. In this manner, a virtual controller instance can be launched in the service provider network on-demand and used to execute an application that was developed for a specific machine controller that resides, or is going to reside, in a facility. Within the virtual machine controller environment, the virtual controller instance may emulate the platform (e.g., operating system and computer architecture) of a physical machine controller. The application that is executed on the virtual controller instance may be an application that is, or is to be, deployed on the physical machine controller for operation within the facility.

In this manner, a user, for example, can test the application executing on the virtual controller instance to validate the application before the application is deployed on a machine controller and used in production. This enables a virtualized, high-fidelity testing and validation environment to develop, test, validate, and/or reprogram applications before the applications are deployed on physical machine controllers within a facility. As another example, a user, such as a technician in training, may employ the virtual machine controller environment to interact with a virtual version of a physical machine controller as if the user was operating the physical machine controller in the facility where the machine controller resides, or is going to reside. This allows a user to gain familiarity and expertise with machine controllers as a training mechanism. In a sense, the virtual machine controller environment allows for building a virtual machine controller in "the cloud," and for interacting with the virtual machine controller without having to operate the corresponding, physical machine controller within the facility where the machine controller is, or will be, operated in production. A "machine controller", as used herein, may comprise a system or device that is configured to produce one or more outputs based on (e.g., in response to) one or more control input conditions within a period of time. A machine controller may produce the one or more outputs in real-time, or near real-time, as the control input condition(s) are determined (e.g., received). A machine controller may be in the form of a computing device (a physical piece of hardware) that executes an application (software) to control various aspects of an electromechanical device(s) or system (s). In some cases, unintended operation of an associated electromechanical device(s) or system(s) may occur if the machine controller fails to produce one or more expected outputs within a prescribed period of time. Examples of a machine controller include, without limitation, a PLC, a PAC, and similar devices and/or systems. Accordingly, it is to be understood that the terminology "machine controller" that is used throughout this disclosure may be replaced with the "PLC" or "PAC" to describe particular examples of machine controllers.

As an illustrative example, an operator of a fulfillment center may onboard a new employee as a technician who is tasked with managing PLCs residing in the fulfillment center. Instead of halting production in the facility and/or purchasing replicas of PLCs and the associated electromechanical systems that those PLCs control, the newly onboarded technician may be provided with access to the disclosed virtual machine controller environment as a network-based service where the user may access the virtual machine controller environment via a portal exposed as a user interface on a user computing device. In this illustrative example, the user may submit a request to create a virtual controller instance for executing an application associated with a PLC that is used to control a sorting machine that sorts items within the fulfillment center. This application may be referred to as a "sorter application" to indicate an association with the PLC used to control the sorting machine. In some embodiments, the user can submit the request to create the virtual controller instance by specifying a value(s) for a characteristic(s) (e.g., a vendor identifier, a processor speed, an amount of storage, a type of communications interface, etc.) of a runtime image that is used to create the virtual controller instance, and then a qualifying virtual controller instance that satisfies the value(s) of the characteristic(s) can be created, and the user may execute the sorter application on the qualifying virtual controller instance. Additionally, or alternatively, the user can create the virtual controller instance by selecting the sorter application (e.g., from a list of available applications), and the MCaaS may identify a target runtime image associated with the sorter application, and may create the virtual controller instance based on the target runtime image to load and execute the sorter application thereon.

An example process implemented by one or more computing devices of a service provider network may include receiving a request to create a virtual controller instance, and creating the virtual controller instance in the service provider network based at least in part on the request. The example process may further include executing, on the virtual controller instance, an application that is associated with a machine controller that is operable within (e.g., that resides, or is going to reside, in) a facility, and sending data as input to the application to elicit a response from the application. Whether it be for training purposes or testing purposes, the response elicited from the application while executing in a virtual machine controller environment can be observed in order to determine how the machine controller application responds to input data. Different types of data can be provided as input to the application to emulate general operating conditions of the machine controller, or to emulate fault conditions of a machine or a sensor within the facility.

By providing a virtual machine controller environment as a network-based service that is accessible to users and/or computer programs, a high-fidelity testing and/or training environment is enabled where users can learn to operate and/or program machine controllers, and where machine controller applications can be tested for validation prior to deployment on a physical machine controller. This, in turn, makes development, testing, management, and/or monitoring of machine controller software more manageable for a facilities operator seeking to implement and/or enhance automation in its facilities. The techniques and systems described herein may, for example, allow for debugging a machine controller application in advance within a virtual machine controller environment, without requiring a facilities operator to purchase expensive replicas of facility equipment or to shut down production in order to test machine controllers and/or to train technicians on-site at the facility. Using the techniques and systems described herein, a facilities operator can test permutations, including fault conditions of machinery and/or sensors that heretofore have been difficult to test, thereby de-risking the facilities operator by mitigating equipment failure and improving operational capabilities of the machine controllers within a facility. In contrast to existing methods of deploying applications by sending control system engineers to facilities and having them validate and deploy the applications on-site at the facility, machine controller applications that are validated in the virtual machine controller environment disclosed herein can be easily deployed on multiple machine controllers at geographically-dispersed facilities by downloading the validated applications over a network, without having to send personnel to those facilities to get machine controllers up-and-running. Improved scalability is also provided by the techniques and systems described herein due to the ability to formulate a high number of test scenarios and to spin up a high number of virtual controller instances that run applications in parallel within the virtual machine controller environment.

While some of the techniques are described herein as being performed in a service provider network accessible from any geographic location, the techniques may similarly be applied in other computing networks, such as on-premise servers at a facility. Also described herein are systems and devices comprising one or more processors and one or more memories, as well as non-transitory computer-readable media storing computer-executable instructions that, when executed by the one or more processors, cause performance of various acts and/or processes disclosed herein. Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a virtual machine controller environment can be implemented as a network-based service accessible to users and/or computer programs. As illustrated, a service provider network 102 may be operated and/or managed by a service provider 104. The service provider network 102 (which may be referred to as a cloud provider network, or sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to commands or requests. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services. As such, the service provider network 102 may provide users and/or computer programs with scalable, on-demand, and network-accessible computing platforms over large geographic regions such that instances are readily-available for use in executing applications in the cloud.

The service provider network 102 may provide various services to users to fulfill their computing resource needs, such as cloud-based computing resources. For example, the service provider network 102 may provide cloud-based, scalable, and network accessible (or network-based) compute power services, storage services, database services, and/or other services. In the present disclosure, the service provider network 102 may provide a Machine Controller as a Service (MCaaS) 106. To utilize the MCaaS 106, users 108 may utilize user devices 110 to register for an account with the service 106. This may allow the users 108 to subscribe to using the MCaaS 106, without having to invest in the computing resources (e.g., on-premise resources) needed to run machine controller applications in a virtual environment. Generally, the user devices 110 may comprise any type of computing device that may be utilized to access the service provider network 102. For instance, the user devices 110 may include, without limitation, laptop computers, desktop computers, tablet computers, server computers, mobile phones (e.g., smartphones), gaming systems (e.g., game consoles), televisions, and/or any computing device usable on its own, or in conjunction with other devices, for accessing the service provider network 102.

Users 108 may utilize the user devices 110 to access the service provider network 102 over one or more networks 112 (e.g., the Internet, wireless wide area networks (WANs), personal area networks (PANs), wired and/or wireless local area networks (LANs), etc.). The network(s) 112 may comprise any type of network or combination of networks, including wired and/or wireless networks. In some embodiments, the users 108 can access one or more network-based services of the service provider network 102 via one or more portals 114, such as, without limitation, a web-based console or user interface, a software-development kit (SDK), a command-line interface (CLI), an application programming interface (API), and/or any other suitable means. Computer programs (or programmatic entities) may access a service(s) of the service provider network 102 via the portal(s) 114 via an API, for example.

In an illustrative example, the user 108 may wish to execute, within a virtual machine controller environment of the service provider network 102, an application 116 that was developed for a physical machine controller (e.g., a PLC, a PAC, etc.) that resides, or is going to reside, in a facility. The user 108 may wish to test the application 116 to see if it functions properly within the virtual machine controller environment, or the user 108 may wish to utilize the virtual machine controller environment as a training environment to gain expertise with the machine controller. The MCaaS 106 may be configured to deploy, operate, and scale compute resources in the cloud-based, or network-based, environment for this user 108. For example, the MCaaS 106 may utilize one or more host computers 118 in a computing-resource network 120 to instantiate one or more virtual controller instances 122 that are allocated to the user 108. These virtual controller instances 122 can be managed by a script, program, and/or application, etc. In some embodiments, multiple virtual controller instances 122 can run in parallel. FIG. 1 shows virtual controller instances 122(1)-(N), where "N" is any positive integer. The virtual controller instances 122 can be referred to herein collectively as "instances 122", "containers 122", or "runtimes 122".

The computing-resource network 120 may include data centers that each include one or more computing resources. The data centers of the computing-resource network 120 may house the host computers 118 and may be located across disparate geographic regions such that computing resources are available to support functionality for cloud-based services provided by the service provider network 102. The computing resources of the computing-resource network 120 may include various combinations of hardware-based components, such as central processing units (CPU), graphics processing units (GPU), memory, storage, network capacity, security, and/or any other type of hardware-based resource to support cloud-based services, such as the MCaaS 106. In some examples, the computing resource network 120 may further include respective memories that store various firmware-based and/or software-based resources that provide the functionality of the services, such as the MCaaS 106.

An individual virtual controller instances 122 may comprise a standardized unit of software for executing one or more applications in the service provider network 102. One or more of these instances 122 may function as a virtual machine controller environment for a user 108, or for a programmatic entity (or computer program). Virtual controller instances 122 may be launched using a "runtime image" (or, sometimes referred to herein as a "machine image"). These runtime images may be maintained in a runtime registry 124. A runtime image maintained in the runtime registry 124 may comprise a series of bits for use in the deployment of software/applications. In some embodiments, a runtime image is a binary executable program that is built from a plain text file, such as a "Dockerfile", which specifies the components that are included in a virtual controller instances 122. In some embodiments, a virtual controller instance 122 created from a runtime image may comprise a Docker container, although it is not limited to a Docker container. For example, a runtime image can be one of multiple different formats including a Docker container, a Virtual Machine, or the like. An individual runtime image in the runtime registry 124 may be of a particular type, among multiple possible types that are defined in terms of one or more characteristics, such as vendor identifier (e.g., targetVendor), processor speed, amount of storage, type of communication interface, etc. With respect to the vendor identifier characteristic, it is to be appreciated that there may be different types of runtime images for different machine controller vendors. For example, a first type of runtime image may be associated with a first vendor (e.g., Vendor A) of a machine controller that differs in one or more aspects as compared to a machine controller of a second vendor (e.g., Vendor B), and, therefore, the runtime registry 124 may maintain a first type of runtime image for a first vendor (e.g., Vendor A), a second type of runtime image for a second vendor (e.g., Vendor B), and so on and so forth for any number of vendors of machine controllers.

In some embodiments, a user 108 may set up one or more virtual private clouds (VPCs) 126, which are configured with public and private subnets, as well as Internet gateways (IGWs). FIG. 1 depicts VPCs 126(1)-(P), where "P" is any positive integer. The VPC 126(1), for example, is shown as including a public subnet(s) 128. In the public subnet(s) 128, the user 108 can implement, or setup, network address translation (NAT) instances for outbound Internet access, and Remote Desktop Gateway instances in an Auto Scaling group for inbound remote administrative access. Furthermore, elastic Internet Protocol (IP) addresses may be associated with the instances 122 in the public subnet(s) 128. Although not shown in the VPC 126(1), a private subnet(s) may be used to implement, or setup, Active Directory domain controllers, which may act as enterprise certificate authorities (CAs) that issue Secure Socket Layer (SSL) certificates to an Active Directory Federation Services infrastructure. Furthermore, Active Directory Federation Services servers may execute in the private subnet(s) of the VPC 126 to authenticate users and/or computer programs and provide security tokens to applications or federated partner applications that trust Active Directory Federation Services. It is to be appreciated that a given VPC 126 may be configured with multiple public subnets 128 and multiple private subnets across multiple availability zones. In some embodiments, external systems or services 130 may be provided with connectivity to one or more applications 116 executing in a virtual machine controller environment, or vice versa. For example, a public IP address can be provided to an external system or service 130, such as a warehouse management service (WMS), a ticketing system, a supervisory control and data acquisition (SCADA) system, or any other suitable external system or service 130, to provide the ability for the external system/service 130 to interact with a machine controller application(s) 116 and/or for the machine controller application(s) 116 to interact with the external system/service 130.

In order to create (e.g., launch) a new virtual controller instance 122, a user device 110, and/or a computing device executing an automated computer program, may submit a request 132 via the portal(s) 114, which may be received by a service manager 134 of the MCaaS 106. The service manager 134 may be configured to manage the provisioning of the virtual machine controller environment by spinning up or spinning down virtual controller instances 122 in response to requests 132. For example, the service manager 134 may be communicatively coupled to an instance provisioner 136 for purposes of creating new virtual controller instances 122 from runtime images that are maintained in the runtime registry 124. The instance provisioner 136 may maintain instance data 138 regarding active instances 122 that have been instantiated, including, without limitation, data regarding a number of active instances 122, identifiers of the active instances 122, and the like. The instance provisioner 136 may use information from the underlying services and populate this information to the instance data 138. The service manager 134 may be configured to retrieve and provide this information to the user devices 110 and/or services 130.

Figure 2:
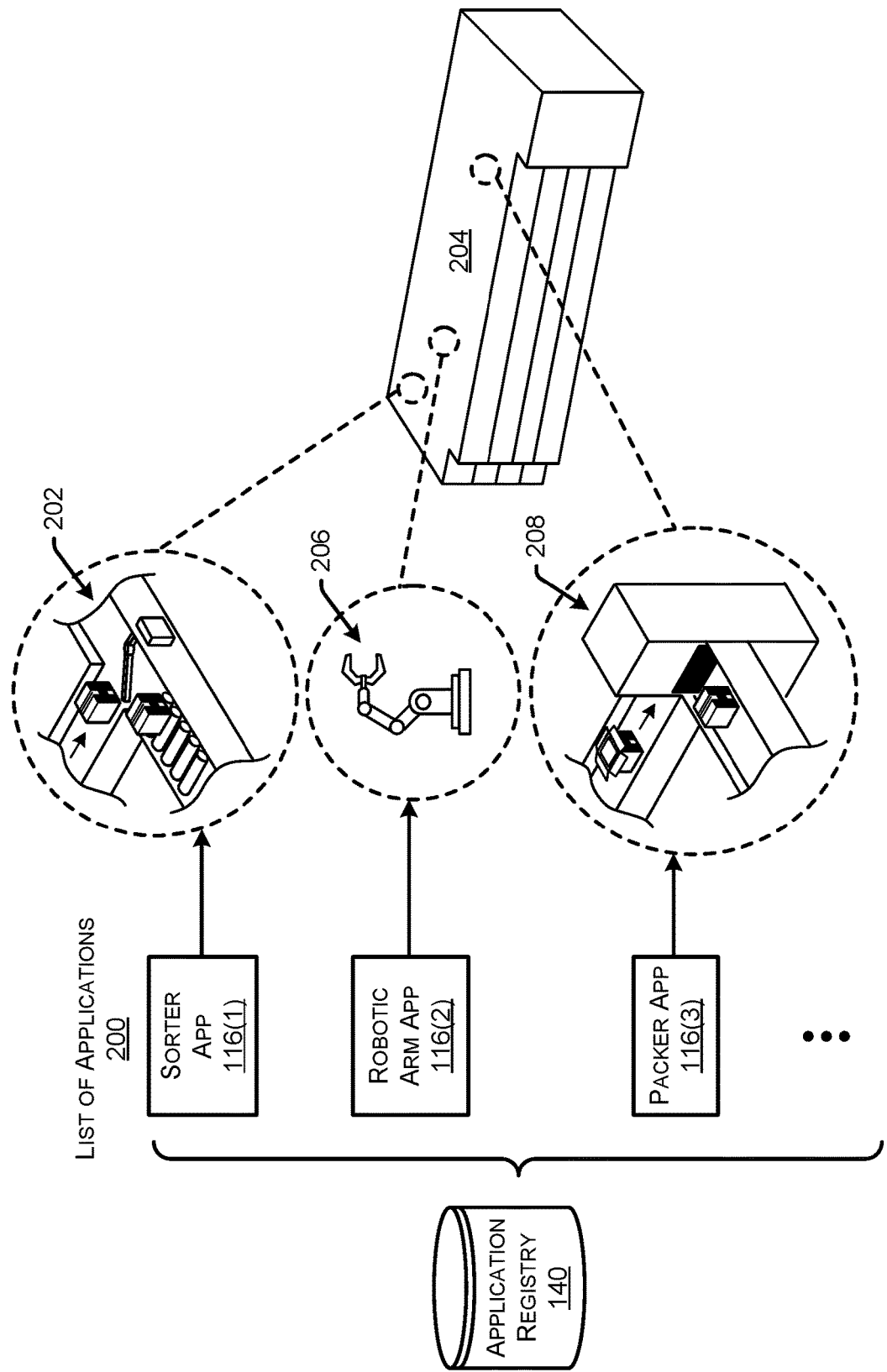
FIG. 2 illustrates a schematic diagram of machine controller-specific application images that are maintained in an application registry.

Requests 132 to create virtual controller instances 122 can be submitted in various ways. For example, a user 108, or a computer program, may select an application 116 from a list of applications that are available to be executed on a virtual controller instance 122. This list of applications 116 may be associated with a plurality of application images that are maintained in an application registry 140. Turning to FIG. 2, there is illustrated an example list 200 of applications 116 that may be associated with the application images maintained in the application registry 140. This example list 200 may be surfaced to a user 108 on a user device 110 for submitting a request 132 by selecting one of the applications 116 in the list 200. The example list 200 includes, without limitation, a sorter application 116(1), a robotic arm application 116(2), and a packer application 116(3). The list 200 may also include identifiable versions of applications 116. The sorter application 116(1) may represent an application (e.g., a software program) that is configured to execute on a machine controller 202, such as a PLC, a PAC, etc., for controlling a sorter machine in a facility 204, such as a fulfillment center or warehouse. The robotic arm application 116(2) may represent an application that is configured to execute on another machine controller 206 for controlling a robotic arm in the facility 204. The packer application 116(3) may represent an application that is configured to execute on yet another machine controller 208 for controlling a packing machine in the facility 204. One or more of these machine controllers 202/206/208 may presently reside in the facility 204, or they may not presently reside, but are going to reside in the facility 204. The ellipses depicted in FIG. 2 indicates that there may be additional machine controller applications 116 in the list 200 that correspond to additional application images in the application registry 140. Furthermore, it is to be appreciated that the list 200 may include fewer applications 116 and/or different applications 116 than those depicted in FIG. 2.

An individual application 116 may have been developed for a target runtime image that is maintained in the runtime registry 124 shown in FIG. 1. Because the runtime images in the runtime registry 124 represent the platform, such as a vendor-specific platform (e.g., an operating system and computer-architecture) of the physical machine controller for which the applications 116 are developed, the applications 116 may be compiled specifically for a target runtime image within the runtime registry 124. It can also be appreciated that a list 200 of applications 116 may include multiple applications 116 for machine controllers that controller the same type of electromechanical device or system, but that are compiled differently. For example, multiple different sorter applications 116 may be in the list 200, each sorter application 116 having been developed for a different target runtime image that corresponds to a particular machine controller for controlling a particular sorter machine in the facility 204.

Returning with reference to FIG. 1, the service manager 134 may receive a request 132 from a user device 110 via the portal 114. The request 132 may indicate that a user 108, for example, has selected a particular machine controller application 116 from a list 200 of available applications 116. The service manager 134 may access metadata to identify a target runtime image in the runtime registry 124 that is associated with the selected application 116. For example, if the user 108 selected the sorter application 116(1) depicted in FIG. 2 from a list 200 of available applications 116, the service manager 134 may access metadata (which can be stored in any suitable location, such as in one of the registries 124 or 140) to identify, from the runtime registry 124, a target runtime image associated with the sorter application 116(1). Upon identifying the target runtime image from the runtime registry 124, the service manager 134 may instruct the instance provisioner 136 to create (e.g., instantiate, launch, etc.) a virtual controller instance 122(1) based on the target runtime image that was identified. The application 116 may be downloaded to the instance 122(1) upon creation of the instance 122(1). The application 116 (e.g., the sorter application 116(1)) can then be executed on the virtual controller instance 122(1) that was launched from the target runtime image, and the user 108 who submitted the request 132 can thereafter interact with the application 116 in a virtual machine controller environment provisioned by the MCaaS 106. When the user 108 is finished interacting with the application 116, the virtual controller instance 122(1) can be spun down or terminated so that it is no longer consuming resources of the computing-resource network 120. During execution of the application 116 on the virtual controller instance 122(1), a control component 142 may provide input data (e.g., input stimulus) to the executing application 116, and a monitor component 144 can monitor the execution of the application(s) 116 (e.g., by observing the output or responses elicited by the input data). FIG. 1 depicts an arrow directly connecting the control component 142 and the monitor component 144 to indicate that a closed-loop architecture is provided where the monitor component 144 can provide feedback to the control component 142 based on the observed output, and this feedback loop can allow for providing additional input data based at least in part on the response(s) (or output) from the executing application 116. The monitor component 144 may additionally, or alternatively, monitor the status of active instances 122 to send alerts to the user 108, or for other reasons. In some embodiments, the control component 142 is configured to receive commands from the service manager 134 and may translate those commands before providing them as input data to elicit a response(s) from the executing application(s) 116. This translation layer allows for implementing a "vendor-agnostic" service 106 where input data (e.g., input stimuli) is translated into a format that is specific to the vendor associated with the instantiated virtual controller instance 122, which, in turn, allows for launching virtual controller instances 122 across a wide variety of platforms (e.g., operating systems and computer architectures). Additionally, or alternatively, a data aggregation component 146 may aggregate data regarding the application(s) 116 and/or the active instances 122 for computing metrics and/or keeping logs of interactions that take place in the virtual machine controller environment.

Figure 3:
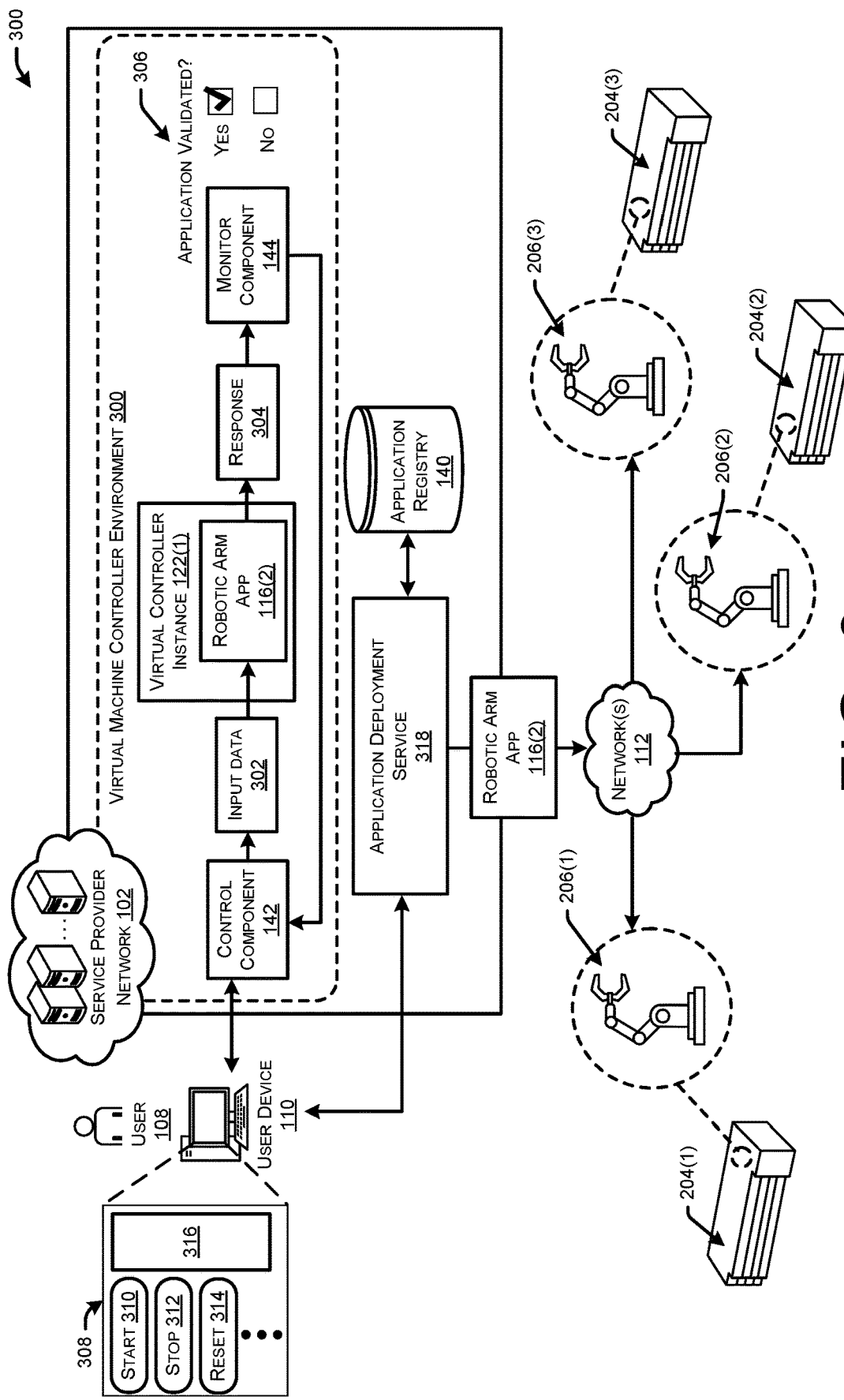
FIG. 3 illustrates a schematic diagram showing a user interacting with an application executing on a virtual controller instance and/or deploying an application on one or more machine controllers over a network.

FIG. 3 illustrates a schematic diagram showing a user 108 interacting with an application 116(2) executing on a virtual controller instance 122(1) within a virtual machine controller environment 300 provisioned by the MCaaS 106. It is to be appreciated that a computer program may interact with an application 116(2) in a similar fashion, without the involvement of a user. The example interaction with the application 116(2) depicted in FIG. 3 may involve one or more computing devices of the service provider network 102 providing data 302 as input to the application 116(2) to elicit a response 304 from the application 116(2). Accordingly, the data 302 is labeled as "input data 302" in FIG. 3.

In the example of FIG. 3, the application 116(2) is a robotic arm application 116(2), which may represent an application 116(2) that is configured to execute on a machine controller 206 (e.g., a PLC, a PAC, etc.) for controlling a robotic arm in a facility 204. The physical machine controller 206 may presently reside in the facility 204, or it may not presently reside, but is going to reside, in the facility 204. The input data 302 may represent an input that the machine controller 206 is configured to receive during operation of the machine controller 206 within the facility 204. For example, the input data 302 may include one or more signals instructing the machine controller 206 to control a robotic arm to pickup an item on a conveyor belt. In some embodiments, the control component 142 is configured to receive commands from the service manager 134 and may translate those commands before providing them as input data 302 to elicit a response(s) 304 from the executing application(s) 116(2). This translation layer allows for implementing a "vendor-agnostic" service where input data 302 is translated into a format that is specific to the vendor associated with the instantiated virtual controller instance 122(1) within the virtual machine controller environment 300. The input data 302 may elicit a response 304 from the robotic arm application 116(2) that indicates the machine controller 206 successfully instructed the robotic arm to pick up the item on the conveyor belt. This may emulate a general operating condition of the machine controller 206 so that the application 206 can be validated based on the response 304 elicited from the application 206. For example, the monitor component 144 may determine (e.g., receive, observe, etc.) the response 304 and may determine a validation result 306 based on the response 304 to designate the application 116 as ready for deployment to the physical machine controller 206. If the response 304 elicited from the application 206 is unexpected or incorrect (e.g., if the machine controller 206 failed to instruct the robotic arm to pickup the item, or if the machine controller 206 instructed the robotic arm to perform a different action, such as place an item on the conveyor), the validation result 306 determined by the monitor component 144 may be to designate the application 206 as not being ready for deployment to the physical machine controller 206. In such a scenario, the user 108 may reprogram the machine controller application 116(2) to fix the issue, run a debugging algorithm, or the like. In some embodiments, the input data 302 may represent fault data associated with a fault condition of a machine or a sensor within the facility 204. For example, the input data 302 may provide a notification that the conveyor unexpectedly stopped moving. Thus, the robotic arm application 116(2) can be tested under various scenarios, including general operating conditions and/or fault conditions to determine if the application 116(2) executes properly under varying conditions. As yet another example, the input data 302 may represent data associated with a specific component of the machine controller, such as field bus data simulating data that is communicated via one or more field buses of the machine controller 206. Accordingly, the virtual machine controller environment 300 allows a user 108 (or a programmatic entity) to assess and/or learn how an application 106 executes, whether it be for testing and validation purposes or for training purposes. The user 108 can create different scenarios and run one or more simulations to determine how the machine controller application 206 behaves in different conditions. The control component 142, the input data 302, the application 116 (and virtual controller instance 122), the response 304 (or output), and the monitor component 144 may collectively represent an execution pipeline where input data 302 may be recursively provided to the executing application 116 to elicit responses 304. This execution pipeline may provide closed-loop feedback from the monitor component 144 back to the control component 142 so that subsequent input data 302 can be provided to the executing application 116 based on the output/responses 304 elicited in a previous iteration.

In some embodiments, the application 116 can be run against an external system or service 130, such as a WMS, to see how the application 116 functions within the external system or service 130. In some embodiments, full machine simulation can be emulated in the virtual machine controller environment 300 to test and validate the application 116. In an illustrative example, a given facility 204 may employ conveyors, robotic arms, drive units, etc., which can send data to an external system 130, such as a WMS. This data may be used for tracking identifiers of items as they move through the facility 204 (e.g., from a pod out in a field that is packaged inside a tote and placed on a conveyor where a robotic arm picks up the tote, and so on and so forth). Accordingly, an external system or service 130 may emit data that is transmitted via the portal 114 so that the data from the external system or service 130 can be provided as input data 302 to the application 116 to elicit a response(s) 304. This might allow a user 108 to interact with a virtual version of a machine controller for a robotic arm that presently resides at a station in the facility 204, without actually impacting the real robotic arm that resides in the facility 204. For example, the user 108 can spin up a virtual controller instance 122 in the virtual machine controller environment 300 and may link the application 116 to an external system or service 130 that provides a data set as input data 302 to emulate what the application 116 would receive if the application 116 was executing on a machine controller at the station within the facility 204. The user 108 may have the ability to reprogram the machine controller application 116(2) to speed up the robotic arm, or use a different grasping strategy, for example.

In some embodiments, communication of data between an external system or service 130 and the virtual machine controller environment 300 where machine controller applications 116 execute may occur using an event-driven service-oriented-architecture (SOA). The architecture may define a service interface having a core service messaging protocol, a library of standard services supported by all (or nearly all) electromechanical systems, and a library of particular services supported by certain electromechanical systems. The core service messaging protocol need not be changed as electromechanical systems are added, replaced, or updated, but new services and support for additional hardware can be added and updated. In an illustrative example, a pick-by-light or a put-to-light system may reside in a facility 204 to guide the activities of individuals and minimize time and errors when picking and placing items. These systems use indication lights to direct individuals to pick and put locations and provide push buttons to confirm the completion of pick and put operations. For each system, the operations of the indication lights and push buttons may be controlled and monitored by a respective machine controller. Using an event-driven SOA service interface, services performed by pick-by-light or put-to-light systems, among others, can be accessed by or exposed to an external system or service 130, such as a WMS, using a library of supported service messages, regardless of the manufacturer and/or machine controller vendor of the systems. Thus, the external system or service 130 can receive data from machine controllers of such electromechanical systems and emit events using this event-driven protocol/interface to stream data via the portal 114 to the MCaaS 106, and users 108 and/or computer programs can link to this stream of event data to run simulations with machine controller applications 116 executing in the virtual machine controller environment 300. Other suitable external systems or services 130 besides WMS may include, without limitation, a ticketing system, a SCADA system, which pertains to metrics and performance-related data, or any other suitable system or service.

FIG. 3 shows that a user interface 308 may be surfaced on the user device 110 for the user 108 to interact with the application 116(2) within the virtual machine controller environment 300. For example, the user interface 308 may provide selectable elements, such as a Start Button 310, a Stop Button 312, a Reset Button 314, or any other suitable element that may be selected by the user 108 to provide input data 302 as an input stimulus to the executing application 116(2). A window 316 can be presented in the user interface 308 to observe the responses 304 elicited from the application 116 based on the input data 302. The window 316 may present display elements that indicate how the application 116 behaves (e.g., the responses 304) based on the input data 302. It is to be appreciated that the user interface 308 may provide additional or alternative functionality to that shown in the example of FIG. 3, such as by providing elements to link to a stream(s) of event data from an external system or service 130, as mentioned above, by providing elements to reprogram machine controller applications 116 (e.g., by modifying code of the applications 116 and saving the modified code), and/or by providing elements to deploy applications 116 over a network 112.

Accordingly, once the user 108, and/or the monitor component 144, is comfortable (e.g., if one or more criteria are met to satisfy the user 108 and/or the monitor component 144) with the functional operation of the machine controller application 116(2) (e.g., after a validation result 306 designates the application 116(2) as validated), the user 108 (or a programmatic entity) may deploy the application 116 in the field. "Deployment", as used in this context, may mean downloading the application 116 over a network 112 (e.g., the Internet) to a machine controller and installing the application 116 thereon for execution of the application 116 on the machine controller in live production within a facility. This is shown in FIG. 3 by virtue of the application deployment service 318. In some embodiments, the deployment of the application(s) 116, such as the robotic arm application 116(2), may occur automatically (e.g., without user intervention) based on the monitor component 144 determining that one or more criteria for deployment have been met. Additionally, or alternatively, a user 108 may initiate the deployment of application(s) 116. For example, the user 108 may submit a request to the application deployment service 318 requesting to deploy the robotic arm application 116(2) to one or more machine controllers over a network 112. In some embodiments, an element may be provided via a user interface (e.g., via the user interface 308) on the user device 110, the element, upon selection, deploying the application 116(2) (e.g., a validated application 116) on a machine controller(s) 206. For example, if the application deployment service 318 receives an indication that such an element has been selected, the application deployment service 318 may deploy the application 116(2) over the network 112 to a machine controller(s) 206. FIG. 3 depicts multiple (e.g., three) machine controllers 206(1), 206(2), and 206(3) that may receive (e.g., download) the application 116(2) for execution on the physical machine controllers 206(1)-(3) in the field. These machine controllers 206(1)-(3) may reside at geographically-dispersed facilities 204(1), 204(2), and 204(3), respectively. As such, a machine controller application 116 can be validated and easily deployed on one or multiple machine controllers without the need to send a technician on-site to the facilities 204 where the machine controller(s) reside(s).

In an illustrative example, the user 108 may have requested creation of a virtual controller instance 122(1) by selecting the robotic arm application 116(2) from a list 200, and the MCaaS 106 may have identified, from the runtime registry 124, a target runtime image associated with the selected robotic arm application 116(2), and may have used the target runtime image to launch the virtual controller instance 122(1) in the service provider network 102. While the robotic arm application 116(2) is executing on the virtual controller instance 122(1), the user 108 may select elements on the user interface 308 to send data 302 as input to the robotic arm application 116(2) to elicit a response(s) 304 from the application 116. This input data 302 may represent input that the physical machine controller 206 is configured to receive during operation of the machine controller 206 within the facility 204. For example, the machine controller 206 for a robotic arm in a facility 204 may be configured to receive signals representing image data of items on a conveyor belt or some other type of data, and may be tasked with picking up items from, and/or placing items down upon the conveyor based on the data. In some embodiments, the input data 302 may represent or emulate normal data that is typically received by the machine controller 206 during general operating conditions. In some embodiments, to determine whether the robotic arm application 116(2) is working properly, the input data 302 may represent or emulate fault data associated with a fault condition of a machine or a sensor within the facility. In some embodiments, the input data 302 may represent or simulate data associated with a component part of the machine controller 206, such as field bus data communicated via one or more field buses of the machine controller.

When the user 108 is satisfied with the functional operation of the robotic arm application 116(2), such as when the application 116(2) is validated, the user 108 may select an element via the user interface to deploy the robotic arm application to a machine controller(s) 206 over a network(s) 112. For example, the user 108 may be on a computer in an office building and may instruct the application deployment service 318 to deploy a newly-Lee validated robotic arm application 116(2) on a remotely located machine controller(s) 206 in a facility 204, even thought the user 108 is not physically located at the facility 204. This can be done across multiple facilities for multiple ones of the same type of machine controller 206 for rapid deployment of software. Furthermore, since the application 116 is validated before deployment within an off-site virtual machine controller environment 300, this helps to de-risk the facilities operator and/or does not involve stopping production in the facilities in order to validate the application 116 before deployment.

Another example way in which a request 132 to create a virtual controller instances 122 can be submitted is by a selection of a value(s) for a characteristic(s) of a runtime image. For example, the runtime registry 124 may store runtime images catalogued by type (e.g., by vendor identifier), version (e.g., V1, V2, V3, etc.), computing architecture (e.g., x8G, ARM, etc.), and the like. These can be expressed as characteristics of a runtime image, such as, without limitation, a processor speed, an amount of storage, or a type of communications interface. For example, a first runtime image in the runtime registry 124 may have a processor speed of 1 Gigahertz, (GHz), 512 Megabytes (MB) of random access memory (RAM), and a Ethernet for Control Automation Technology (EtherCAT) bus for a communications interface (or field buses). Meanwhile, a second runtime image in the runtime registry 124 may have a processor speed of 2 GHZ, 1 Gigabyte (GB) of RAM, and a Gigabit ethernet communications interface. It is to be appreciated that a runtime image may be associated with multiple interfaces (e.g., EtherCAT and Gigabit, EtherCAT and Modbus, etc.) Accordingly, a user 108 may submit a request 132 to create a virtual controller instance 122 by specifying a value(s) for a characteristic(s) of a runtime image (e.g., 2 GHz processor, 1 GB of RAM, and/or a CAN bus, etc.), and the service manager 134, upon receiving the request 132, may identify, from the runtime registry 124, a qualifying runtime image that satisfies (e.g., meets or exceeds, strictly exceeds, etc.) the value(s) for the characteristic(s) of the runtime image. The service manager 134 can then instruct the instance provisioner 136 to create a new virtual controller instance 122 based at least in part on the qualifying runtime image that was identified. Once the instance 122 is launched in the service provider network 102, the user 108 (or a programmatic entity) can load an application 116 for a specific machine controller on the instance 122 and execute the application 116 on the instance 122 so that the user 108 (or the programmatic entity) can interact with the executing application 116, as described herein.

Figure 4:
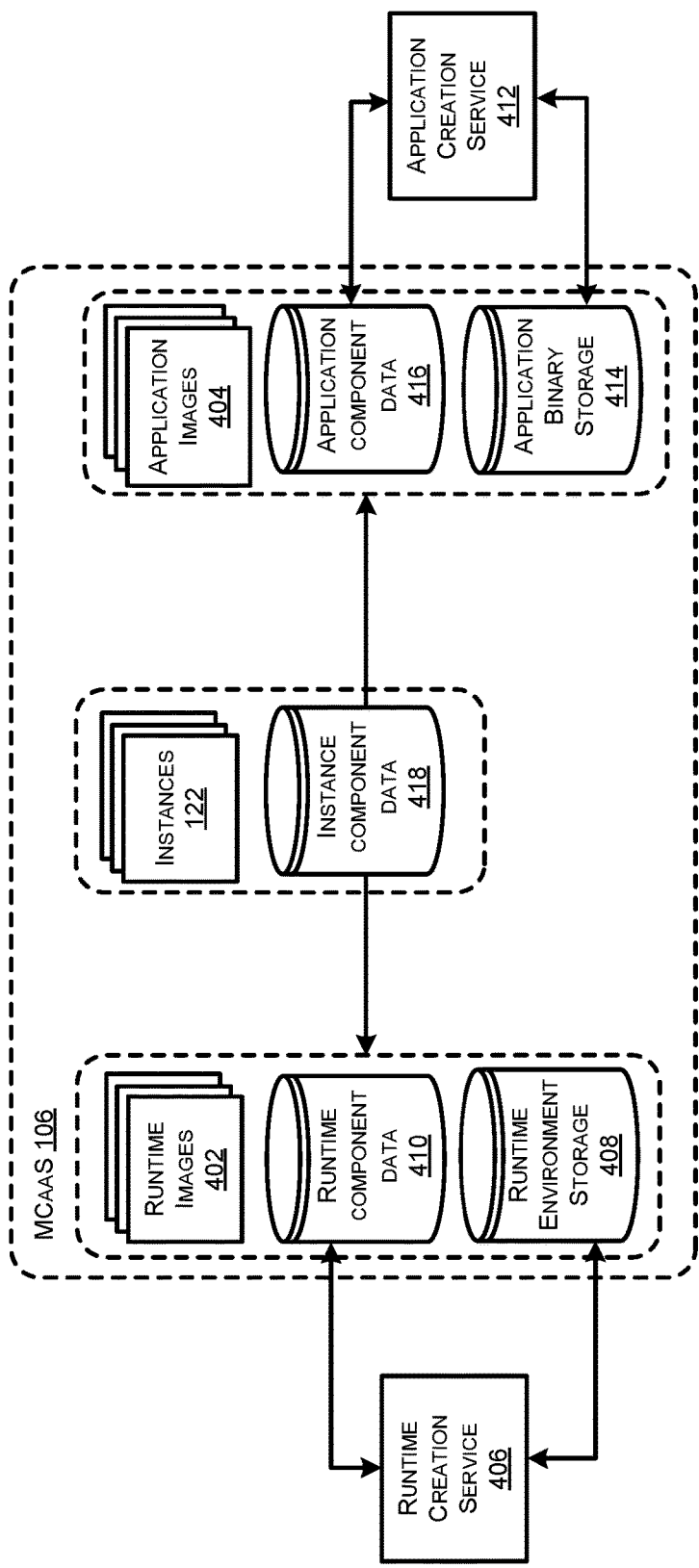
FIG. 4 illustrates a system-architecture diagram of an example environment for creating new runtime images and/or application images that are to be utilized in the virtual machine controller environment.

FIG. 4 illustrates a system-architecture diagram of an example environment 400 for creating new runtime images 402 and/or application images 404 that are to be utilized in the virtual machine controller environment 300. In some embodiments, the creation of runtime images 402 and application images 404 is external to the MCaaS 106 described herein. For example, FIG. 4 shows a runtime creation service 406 that is configured to create new runtime images 402, submit those runtime images 402 to the MCaaS 106, and the MCaaS 106 stores the runtime images 404 in runtime environment storage 408 along with runtime component data 410, which may include metadata describing the runtime images 402 (e.g., in terms of their characteristics). The runtime environment storage 408 may represent the runtime registry 124, in some embodiments. It is to be appreciated that multiple repositories and/or registries 124 of runtimes can be maintained, where a repository or registry 124 includes multiple runtime images 402. FIG. 4 also shows an application creation service 412 that is configured to create new application images 404, submit those application images 404 to the MCaaS 106, and the MCaaS 106 stores the application images 404 in application binary storage 414 along with application component data 416, which may include metadata describing the application images 404. The application binary storage 414 may represent the application registry 140, in some embodiments. It is to be appreciated that multiple repositories and/or registries 140 of applications can be maintained, where a repository or registry 140 includes multiple application images 404. In some embodiments, an application 116 comprises a compiled (deployable) binary application and metadata associated therewith, and this compiled binary application may be stored in the application binary storage 414. FIG. 4 also shows that instance component data 418 may be stored for describing instances 122 that are created from runtime images 402 and used to execute applications 116 within the virtual machine controller environment 300. For example, the instance component data 418 may describe what runtime image 402 and/or application image 404 was deployed to the instance 122, and/or the instance component data 418 may describe parameters of the computing platform used to execute the instance 122. It is to be appreciated that, although the services 106, 406, and 412 are shown in FIG. 4 as separate services, two or more of the services 106, 406, and 412 may be combined and may be provided as a single service. Furthermore, two or more of the storage elements 408, 410, 414, 416, and 418 may be combined and may be provided as a single storage element.

Figure 5:
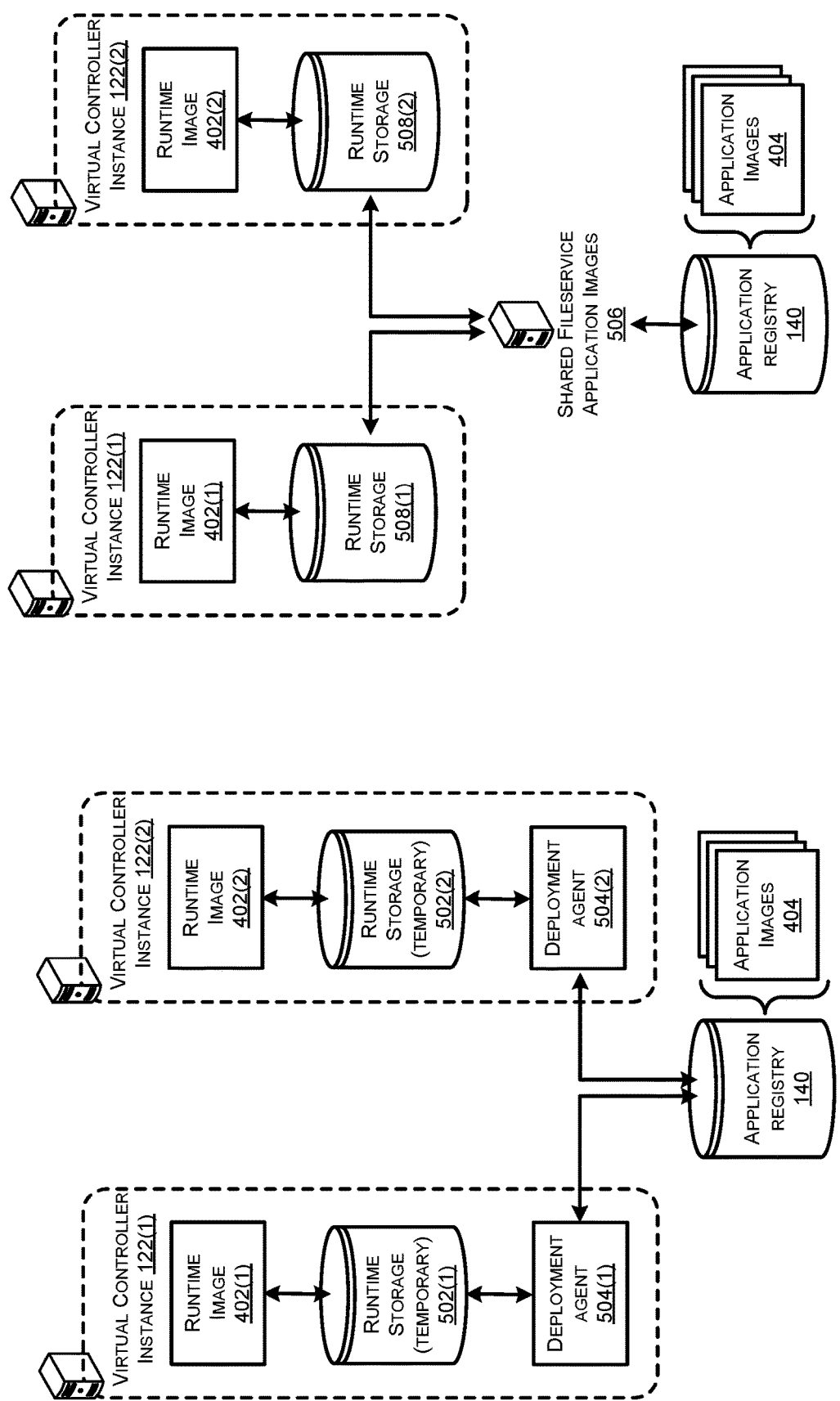
FIG. 5A illustrates an example of implementing virtual controller instances where ephemeral data storage is supported.
FIG. 5B illustrates an example of implementing virtual controller instances where persistent data storage is supported.

FIG. 5A illustrates an example of implementing virtual controller instances 122 where ephemeral data storage is supported. For example, in a scenario where the underlying instance runtime executing technology supports ephemeral (temporary) data storage, but not persistent storage, a virtual controller instance 122 may include multiple internal components, such as the runtime image 402 from which the instance 122 was launched, temporary runtime storage 502, and a deployment agent 504 that is configured to deploy the application image 404 to the temporary runtime storage 502. FIG. 5A shows an example where a first virtual controller instance 122(1) is created by a first deployment agent 504(1) deploying an application image 404 (accessed from the application registry 140) to first temporary runtime storage 502(1), and a first runtime image 402(1) may be used to launch the virtual controller instance 122(1) with an application 116 corresponding to the application image 404 executing on the instance 122(1). Meanwhile, a second virtual controller instance 122(2) may be created by a second deployment agent 504(2) deploying an application image 404 (accessed from the application registry 140) to second temporary runtime storage 502(2), and a second runtime image 402(2) may be used to launch the virtual controller instance 122(2) with an application 116 corresponding to the application image 404 executing on the instance 122(2).

FIG. 5B illustrates an example of implementing virtual controller instances 122 where persistent data storage is supported. For example, in a scenario where the instance executing technology supports persistent file systems, a deployment component may be extracted from each instance 122, and may be used to transform and prepare the application images 404 to be available through a shared file service of application images 506. In this example, application images 404 may be deployed to persistent runtime storage 508. FIG. 5B shows an example where a first virtual controller instance 122(1) is created by deploying an application image 404 (accessed from the application registry 140) to first persistent runtime storage 508(1). A first runtime image 402(1) may be used to launch the virtual controller instance 122(1) with an application 116 corresponding to the application image 404 executing on the instance 122(1). Meanwhile, a second virtual controller instance 122(2) may be created by deploying an application image 404 (accessed from the application registry 140) to second persistent runtime storage 508(2). A second runtime image 402(2) may be used to launch the virtual controller instance 122(2) with an application 116 corresponding to the application image 404 executing on the instance 122(2).

The processes described herein are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 6:
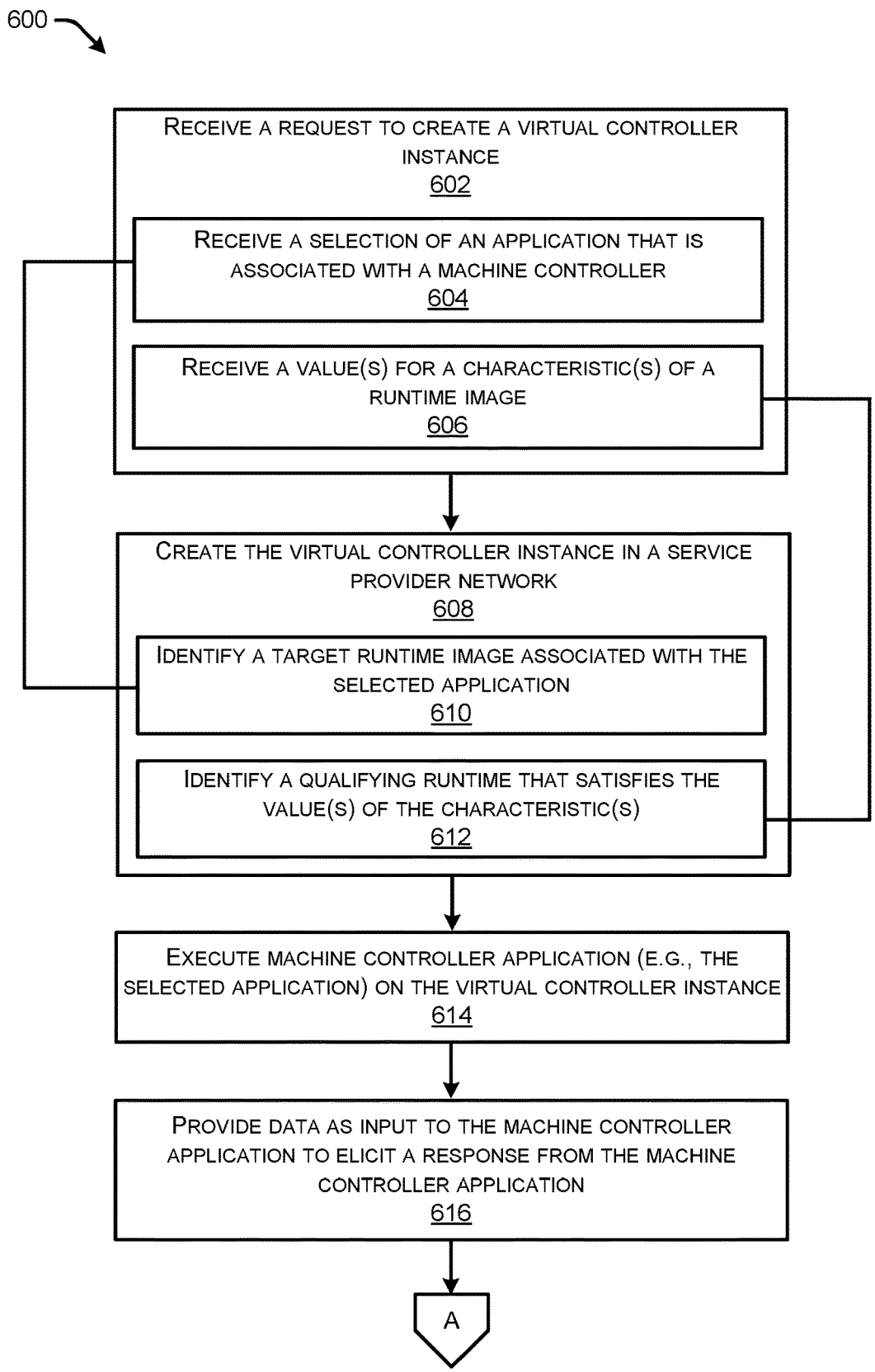
FIG. 6 illustrates a flow diagram of an example process for executing a machine controller application within a virtual machine controller environment, according to an embodiment.

FIG. 6 illustrates a flow diagram of an example process 600 for executing a machine controller application 116 within a virtual machine controller environment, according to an embodiment. For discussion purposes, the process 600 is described with reference to the previous figures.

At 602, a computing device(s) of a service provider network 102 may receive a request 132 to create a virtual controller instance. The request 132 received at block 602 may be received from a user 108 (e.g., via a user device 110). The request 132 received at block 602 may alternatively be received from a computer program (i.e., a programmatic entity) executing on a computing device as part of an automated platform. In some embodiments, the request 132 may be received via a portal 114 and by the service manager 134 of a MCaaS 106 that is a network-based service provided in the service provider network 102. In some embodiments, the request 132 may be submitted via an API, such as a CreateInstance API, which may use Hypertext Transfer Protocol (HTTP) POST as a request method. As shown by sub-blocks 604 and 606, the request 132 may be received at block 602 in various ways.

At sub-block 604, the receiving of the request 132 at block 602 may comprise receiving a selection of an application 116 that is associated with a machine controller that is associated with (e.g., that resides, or is going to reside, in) a facility 204. For example, a user interface may be displayed on a user device 110 that presents a list 200 of available applications 116 for a user 108 to select as a way to create a new virtual controller instance 122 for executing a machine controller application 116 in a virtual machine controller environment 300. Accordingly, at sub-block 604, the MCaaS 106 (e.g., the service manager 134) may receive, via the user interface, a selection of an application 116 from the list 200 of available applications 116. For example, a selection of the sorter application 116(1) (See FIG. 2) may be received in the request 132 at sub-block 604.

At sub-block 606, the receiving of the request 132 at block 602 may comprise receiving a value(s) for a characteristic(s) of a runtime image 402. For example, the characteristic(s) of the runtime image 402 may comprise a processor speed, an amount of storage, and/or a type of communications interface associated with the runtime image 402. In some embodiments, a characteristic(s) of the runtime image 402 may be a version of the runtime image 402 or some other characteristic of the computing architecture of the runtime image 402.

At 608, the computing device(s) of the service provider network 102 may create, based at least in part on the request 132, the virtual controller instance 122 in the service provider network 102. Creating the virtual controller instance 122 at block 608 may include using a runtime image to launch the virtual controller instance 122 in the service provider network. The virtual controller instance 122 created (e.g., launched, spun up, instantiated, etc.) at block 608 may comprise a standardized unit of software for executing one or more applications in the service provider network 102. For example, the virtual controller instance 122 may comprise a Docker container, or any other suitable type of instance using any suitable containerization and/or virtualization technology, such as a virtual machine, etc. As shown by sub-blocks 610 and 612, the creation of the virtual controller instance 122 at block 608 may vary depending on the way the request 132 was submitted. These associations are depicted in FIG. 6 by the lines connecting sub-block 604 to sub-block 610, and sub-block 606 to sub-block 612.

At sub-block 610, the creating of the virtual controller instance 122 at block 608 may comprise identifying, from a runtime registry 124 that maintains a plurality of runtime images 402, a target runtime image 402 associated with the application 116 that was selected at sub-block 604. For example, if the sorter application 116(1) (See FIG. 2) was selected at sub-block 604, the computing device(s) may access metadata at sub-block 610 to identify, from a runtime registry 124 that maintains a plurality of runtime images 402, a target runtime image 402 associated with the sorter application 116(1). The metadata accessed for identifying the target runtime image may describe the characteristics of the runtime images 402 in the runtime registry 124 and may "link" to application images 404 maintained in the application registry 140. The virtual controller instance 122 may then be created (e.g., launched, spun up, instantiated, etc.) based at least in part on the target runtime image 402 identified at sub-block 610.

At sub-block 612, the creating of the virtual controller instance 122 at block 608 may comprise identifying, from a runtime registry 124 that maintains a plurality of runtime images 402, a qualifying runtime image 402 that satisfies the value(s) for the characteristic(s) received at sub-block 606. For example, if the user specified the values: 2 GHz processor, 1 GB of RAM, an bus type: CAN, the computing device(s) may identify, from a runtime registry 124 that maintains a plurality of runtime images 402, a qualifying runtime image 402 that satisfies (e.g., meets or exceeds, strictly exceeds, etc.) those values. The virtual controller instance 122 may then be created (e.g., launched, spun up, instantiated, etc.) based at least in part on the qualifying runtime image 402 identified at sub-block 612. Once the instance 122 is created, a machine controller application 116 may be downloaded to the instance 122 as part of block 608.

At 614, the computing device(s) of the service provider network 102 may execute a machine controller application 116 on the virtual controller instance 122 that was created at block 612. For example, if a selection of a machine controller application was received at sub-block 604, the selected machine controller application 116 may be automatically loaded and executed on the virtual controller instance 122 at block 614. For example, if the user 108 selected the sorter application 116(1) at sub-block 604, the sorter application 116(1) may be executed on the virtual controller instance 122. If the request 132 was submitted with a value(s) for a characteristic(s) of a runtime image 402, the user 108 (or a programmatic entity) may select an application 116 to execute on the virtual controller instance 122. In either case, the application 116 is associated with a machine controller that resides, or is going to reside, in a facility 204. For example, a machine controller 202 for a sorter machine may presently reside in a facility 204, and the user 108 who submitted the request 132 may want to learn how to operate the machine controller 202 in a virtual machine controller environment where the physical machine controller 202 remains unimpacted. Additionally, or alternatively, the user 108 who submitted the request 132 may be tasked with validating the sorter application 116(1) prior to its deployment on the machine controller 202 residing in the facility 204, or perhaps the machine controller 202 was newly purchased by the facilities operator and is being prepared for operation within the facility 204.

At 616, the computing device(s) of the service provider network 102 may send (e.g., provide) data 302 as input to the application 116 executing on the virtual controller instance 122 to elicit a response 304 from the application 116. This input data 302 may represent input that the physical machine controller is configured to receive during operation of the machine controller within the facility 204. For example, the machine controller 202 for a sorter machine in the facility 204 may be configured to receive signals representing image data of items on a conveyor belt, and may be tasked with sorting items based on the image data. Depending on the type of machine controller, the input data 302 can vary. In some embodiments, the input data 302 may represent or emulate normal data that is typically received during general operating conditions. In some embodiments, to determine whether the machine controller application 116 is working properly, the input data 302 may represent or emulate fault data associated with a fault condition of a machine or a sensor within the facility. For example, if an image sensor (e.g., a camera) used by the machine controller 202 becomes faulty and starts sending data that does not make sense for sorting items on a conveyor, the machine controller application 116 may be programmed to respond in a way that minimizes downtime in the facility 204 while the machine or sensor is fixed. In some embodiments, the input data 302 may represent or simulate data associated with a component part of the machine controller, such as field bus data communicated via one or more field buses of the machine controller.

In some embodiments, a communications interface that the machine controller is configured to connect to can be emulated within the virtual machine controller environment 300 such that the input data 302 provided to the machine controller application 116 at block 616 represents or simulates communication signals that the machine controller may receive via the communications interface. For example, a process for picking up a tote on a conveyor in the facility might involve multiple signals provided as input to a machine controller that controls the electromechanical system that picks up the tote. In some embodiments, the machine controller application 116 may be configured to interpret these multiple signals as an instruction to pick up the tote from the conveyor if they are received in a particular sequence and within a particular time period. Accordingly, the input data 302 can be provided as input to the machine controller application 116 to, for example, make the application 116 think that it should pick up a tote, and the response 304 elicited from the application 116 can be monitored. In this running example, a fault condition may be emulated by sending a subset, but not all, of the multiple signals, and/or by sending the signals in a different sequence or over a different (e.g., longer) period of time. In some embodiments, the input data 302 provided as input to the machine controller application 116 at block 616 may be received from an external system or service 130, such as a warehouse management system (WMS) to which the application 116 executing on the virtual controller instance 122 is linked (e.g., via public IP address).

The process 600 may be used to implement a testing and/or training environment in the cloud for users 108 or programmatic entities. This virtual machine controller environment 300 can be provided in a manner such that the operations of the facility where a machine controller is used can remain unimpacted while the testing and/or training is taking place.

Figure 7:
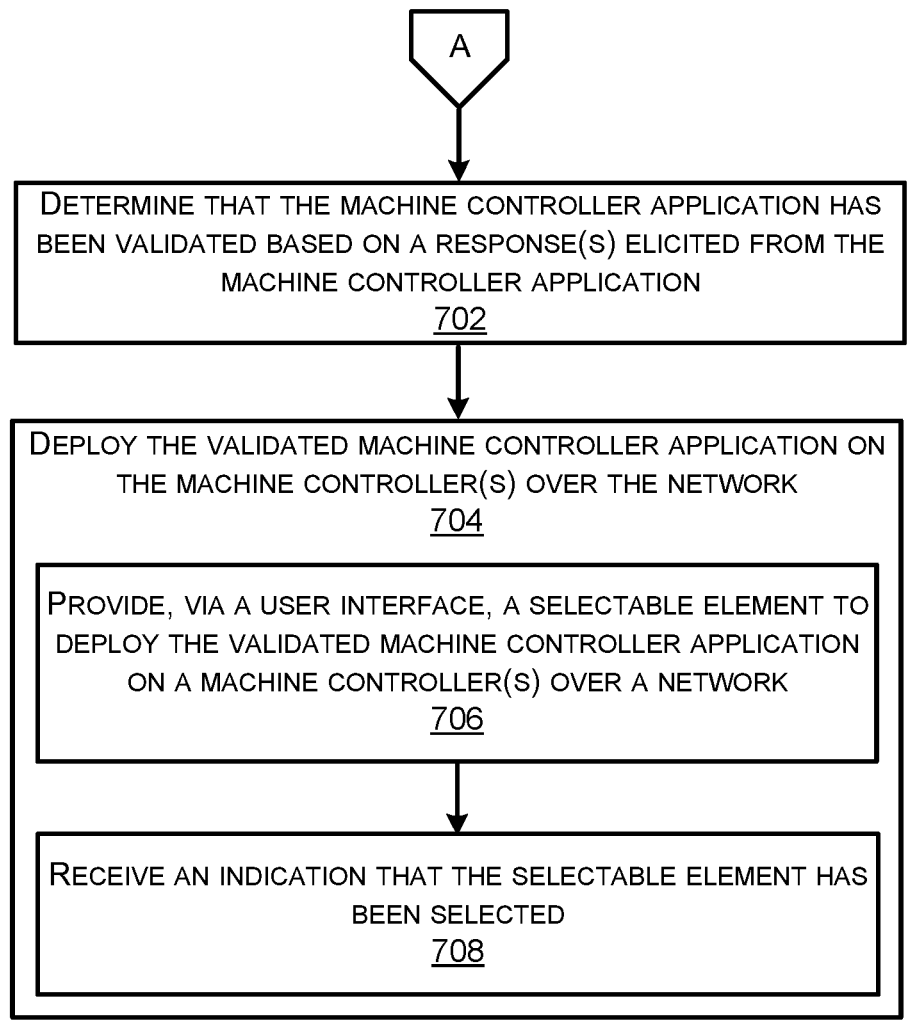
FIG. 7 illustrates a flow diagram of an example process for deploying a validated machine controller application on one or more machine controllers over a network, according to an embodiment.

FIG. 7 illustrates a flow diagram of an example process 700 for deploying a validated machine controller application 116 on one or more machine controllers over a network 112, according to an embodiment. As shown by the off-page reference "A" in FIGS. 6 and 7, the process 700 may continue from block 616 of the process 600, after one or more responses 304 have been elicited from the machine controller application 116 within the virtual machine controller environment 300. For discussion purposes, the process 700 is described with reference to the previous figures.

At 702, a computing device(s) of the service provider network 102 may determine, based on one or more responses 304 elicited from the application 116 within the virtual machine controller environment 300, that the application 116 has been validated as a validated application. For example, if the responses 304 are expected based on the input data 302 provided to the executing application 302, the application 116 may be deemed ready for deployment on a machine controller(s), and the computing device(s) may designate the application 116 as being ready for deployment on a machine controller(s). In some embodiments, a user 108 may make this determination based on observing the response(s) 304 elicited from the application 116. In some embodiments, a computer program, such as the monitor component 144, may automate this determination based on the response(s) 304 elicited from the application 116 satisfying one or more criteria.

At 704, the computing device(s) of the service provider network 102 may deploy, over a network 112, the validated application 116 on the machine controller(s) (e.g., the machine controllers 206(1)-(3) shown in FIG. 3). In some embodiments, the validated application 116 may be downloaded to the machine controller(s) directly, or to another computing device(s) in the facility 204 where the machine controller resides, over the Internet. In some embodiments, the validated application 116 may be deployed on a plurality of machine controllers that are a same type of machine controller, as depicted in FIG. 3 with the machine controllers 206(1)-(3), which are configured to control the same type of robotic arm in different, geographically-dispersed facilities 204(1)-(3). This deployment at block 704 may occur automatically (e.g., without user intervention). For example, the application deployment service 318 may identify the machine controller(s) to which the validated application 116 is to be deployed, and may initiate the download of the application 116 over the network 112 to the identified/selected machine controller(s). As shown by sub-blocks 706 and 708, however, the deployment at block 704 may occur in response to a user input received by the computing device(s).

At sub-block 706, for example, the computing device(s) of the service provider network 102 may provide, via a user interface, an element that, upon selection, deploys the validated application 116 on one or more machine controllers over a network 112. This user interface may be surfaced via the application deployment service 318 shown in FIG. 3.

At sub-block 708, the computing device(s) of the service provider network 102 may receive an indication that the element has been selected. For example, a user 108 may select an element to deploy the validated application 116 on one or more machine controllers. In some embodiments, the user 108 may select a machine controller on which the validated application 116 is to be deployed. Additionally, or alternatively, the application deployment service 318, with access to the application registry 140, may determine the appropriate machine controller(s) and may automatically select those machine controllers for confirmation by the user 108.

Figure 8:
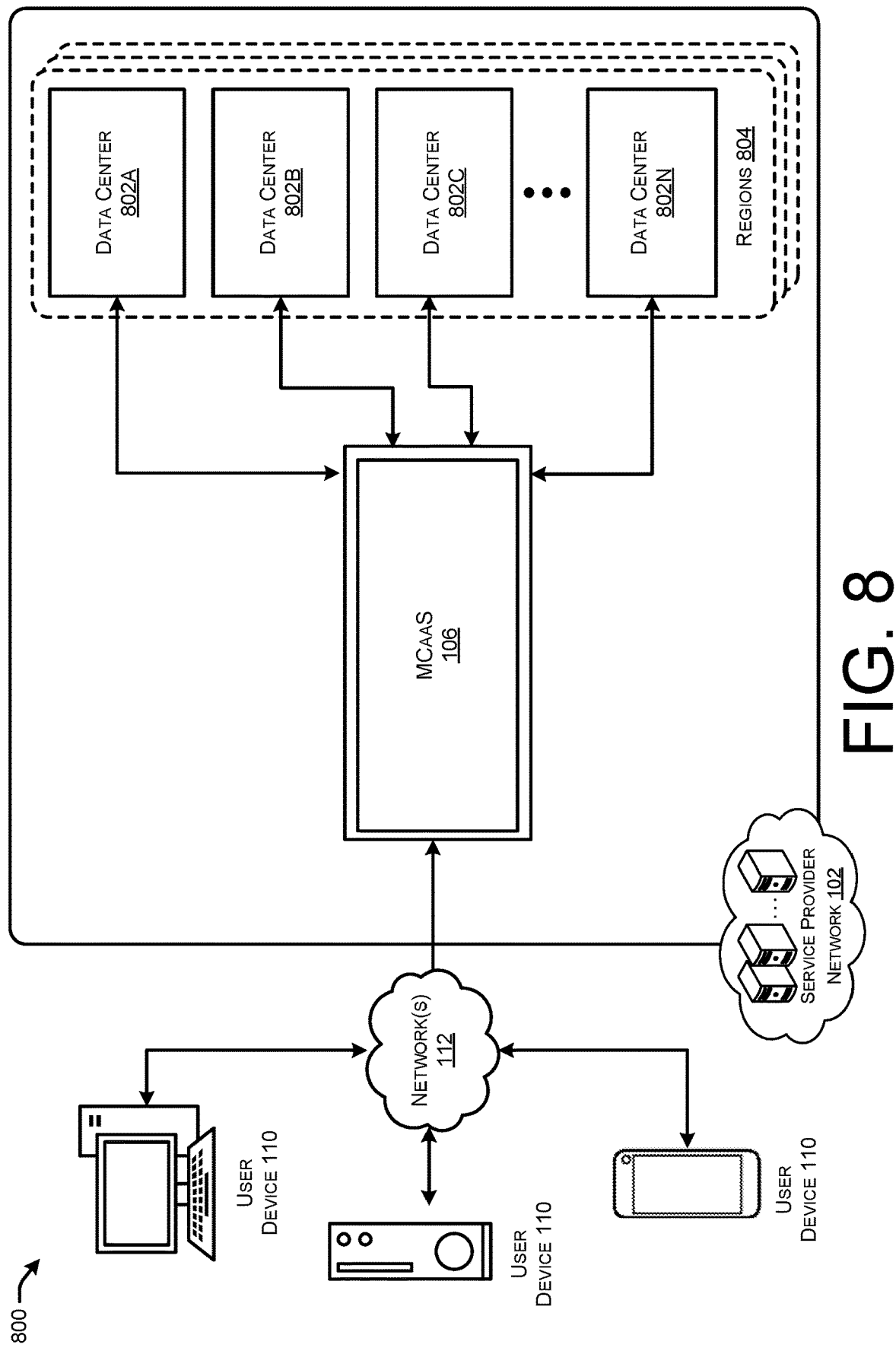
FIG. 8 is a system and network diagram that shows an illustrative operating environment that includes a service provider network that can be configured to implement aspects of the functionality described herein.

FIG. 8 is a system and network diagram that shows an illustrative operating environment 800 that includes a service provider network 102 that can be configured to implement aspects of the functionality described herein. The service provider network 102 can provide computing resources, like virtual controller instances 122, virtual machine (VM) instances, and storage, on a permanent or an as-needed basis. Among other types of functionality, the computing resources provided by the service provider network 102 may be utilized to implement the various services and components described above. As also discussed above, the computing resources provided by the service provider network 102 can include various types of computing resources, such as data processing resources like virtual controller instances 122, VM instances, data storage resources, networking resources, data communication resources, network services, and the like.

Each type of computing resource provided by the service provider network 102 can be general-purpose or can be available in a number of specific configurations. For example, data processing resources can be available as physical computers or virtual controller instances 122 in a number of different configurations. The virtual controller instances 122 can be configured to execute applications (e.g., machine controller applications 116), and possibly other types of programs including, without limitation, web servers, application servers, media servers, database servers, gaming applications, some or all of the network services described above. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 802A-802N (which might be referred to herein singularly as "a data center 802" or in the plural as "the data centers 802"). The data centers 802 are facilities utilized to house and operate computer systems and associated components. The data centers 802 typically include redundant and backup power, communications, cooling, and security systems. The data centers 802 can also be located in geographically disparate locations, or regions 804. One illustrative embodiment for a data center 802 that can be utilized to implement the technologies disclosed herein will be described below with regard to FIG. 9.

The users 108 (and programmatic entities) that utilize the service provider network 102 may access the computing resources provided by the service provider network 102 over any wired and/or wireless network(s) 112, which can be a wide area communication network ("WAN"), such as the Internet, an intranet or an Internet service provider ("ISP") network or a combination of such networks. For example, and without limitation, a user device 110 operated by user 108 of the service provider network 102 may be utilized to access the service provider network 102 by way of the network(s) 112. It should be appreciated that a local-area network ("LAN"), the Internet, or any other networking topology known in the art that connects the data centers 802 to remote clients and other users can be utilized. It should also be appreciated that combinations of such networks can also be utilized. As illustrated, the automated MCaaS 106 may provide a virtual machine controller environment 300 where machine controller applications can execute on virtual controller instances 122, as described herein.

Figure 9:
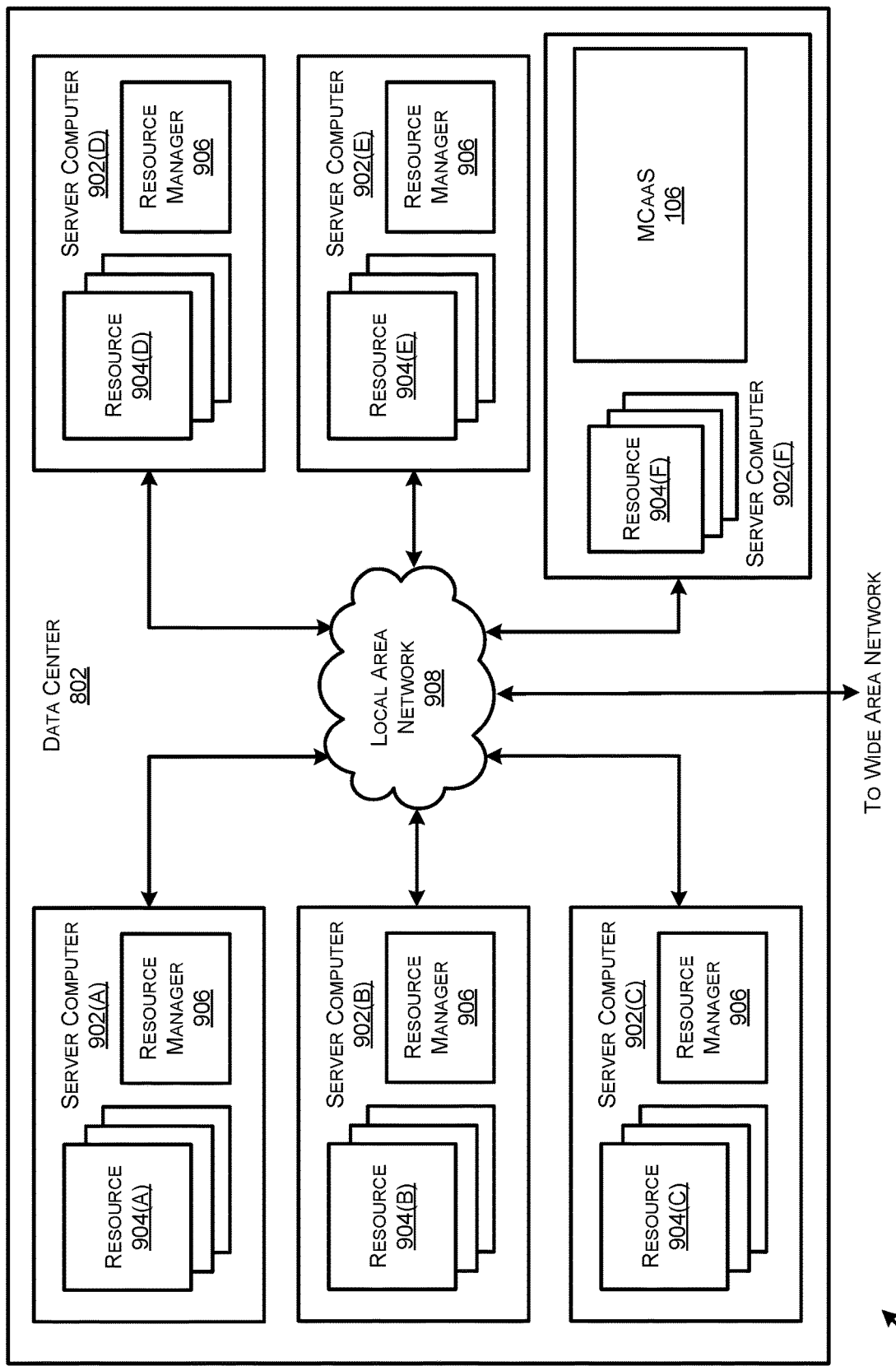
FIG. 9 is a computing system diagram illustrating a configuration for a data center that can be utilized to implement aspects of the technologies disclosed herein.

FIG. 9 is a computing system diagram 900 that illustrates one configuration for a data center 802 that implements aspects of the technologies disclosed herein. The example data center 802 shown in FIG. 9 includes several server computers 902A-902F (which might be referred to herein singularly as "a server computer 902" or in the plural as "the server computers 902") for providing computing resources 904A-904E. In some examples, the resources 904 and/or server computers 902 may include, be included in, or correspond to, the computing resource network 120 described herein.

The server computers 902 can be standard tower, rackmount, or blade server computers configured appropriately for providing the computing resources described herein (illustrated in FIG. 9 as the computing resources 904A-904E). The computing resources provided by the service provider network 102 can be data processing resources such as virtual controller instances 122 or hardware computing systems, database clusters, computing clusters, storage clusters, data storage resources, database resources, networking resources, and others. Some of the servers 902 can also be configured to execute a resource manager 906 capable of instantiating and/or managing the computing resources. In the case of virtual controller instances 122 for example, the resource manager 906 can be a hypervisor or another type of program configured to enable the execution of multiple virtual controller instances 122 on a single server computer 902. Server computers 902 in the data center 802 can also be configured to provide network services and other types of services.

In the example data center 802 shown in FIG. 9, an appropriate LAN 908 is also utilized to interconnect the server computers 902A-902F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 802A-802N, between each of the server computers 902A-902F in each data center 802, and, potentially, between computing resources in each of the server computers 902. It should be appreciated that the configuration of the data center 802 described with reference to FIG. 9 is merely illustrative and that other implementations can be utilized.

The data center 802 shown in FIG. 9 also includes a server computer 902F that can execute some or all of the software components described above. For example, and without limitation, the server computer 902F (and the other server computers 902) can generally correspond to a server/computing device configured to execute components including, without limitation, the MCaaS 106 that manages the deployment of virtual controller instances 122, as described herein, and/or the other software components described above. The server computer 902F can also be configured to execute other components and/or to store data for providing some or all of the functionality described herein. In this regard, it should be appreciated that the components illustrated in FIG. 9 as executing on the server computer 902F can execute on many other physical or virtual servers in the data centers 802 in various embodiments. Thus, the data center 802 in FIG. 9 may also include a plurality of server computers 902 that execute a fleet of virtual controller instances 122. It is to be appreciated that the host computers 118 depicted in FIG. 1 may be any of the servicer computers 902 of FIG. 9. As such, the host computers 118 of FIG. 1 may be within the same data center 802. Alternatively, the host computer(s) 118 may be distributed across multiple data centers 802.

Figure 10:
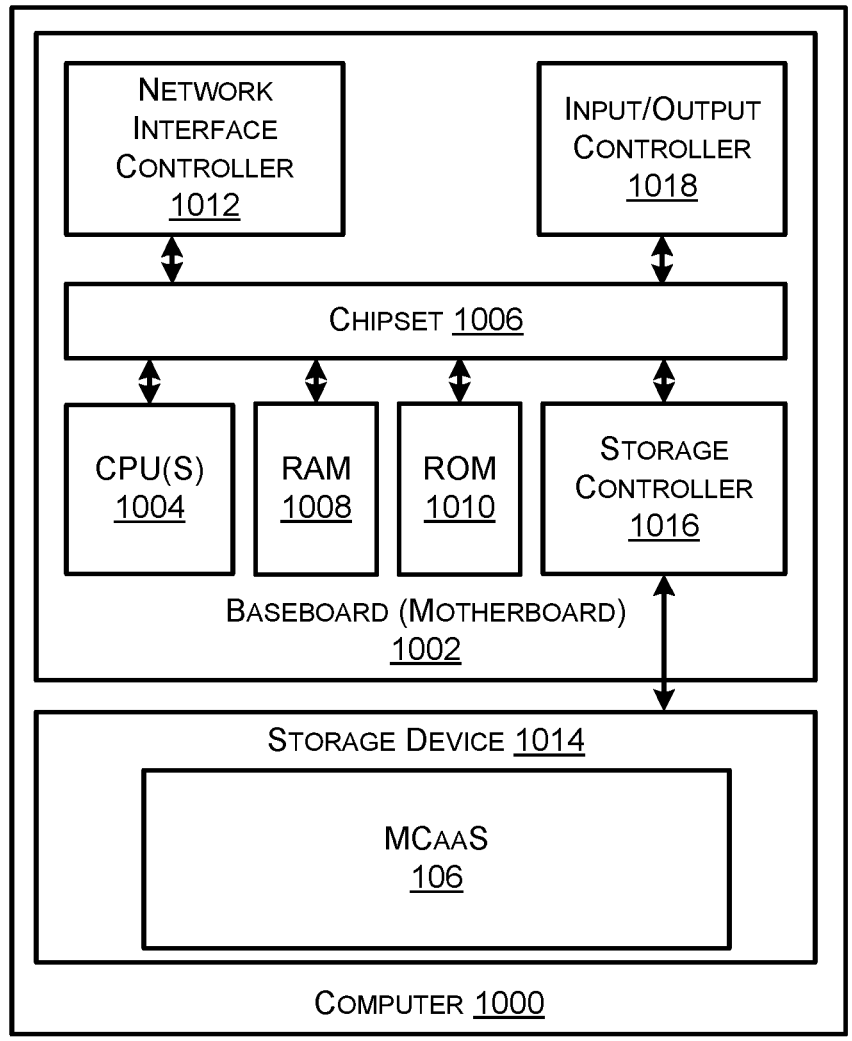
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a server computer, workstation, desktop computer, laptop, tablet, network appliance, e-reader, smartphone, or other computing device, and can be utilized to execute any of the software components presented herein. In some examples, the server computer 1000 may correspond to one or more computing devices that implements the components and/or services described in FIG. 1.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a random-access memory (RAM) 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 908. The chipset 1006 can include functionality for providing network connectivity through a network interface controller (NIC) 1012, such as a gigabit Ethernet adapter. The NIC 1012 is capable of connecting the computer 1000 to other computing devices over the network 908 (or 110). It should be appreciated that multiple NICs 1012 can be present in the computer 1000, connecting the computer to other types of networks and remote computer systems.

The computer 1000 can be connected to a mass storage device 1014 that provides non-volatile storage for the computer. The mass storage device 1014 can store an operating system, programs, and/or components including, without limitation, the MCaaS 106 that manages the deployment of virtual controller instances 122, as described herein, and data, which have been described in greater detail herein. The mass storage device 1014 can be connected to the computer 1000 through a storage controller 1016 connected to the chipset 1006. The mass storage device 1014 can consist of one or more physical storage units. The storage controller 1016 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1014 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1014 is characterized as primary or secondary storage, and the like.

For example, the computer 1000 can store information to the mass storage device 1014 by issuing instructions through the storage controller 1016 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1014 by detecting the physical states or characteristics of one or more particular locations within the physical storage units.

In addition to the mass storage device 1014 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000. In some examples, the operations performed by the service provider network 102, and or any components and/or services included therein, may be supported by one or more devices similar to computer 1000. Stated otherwise, some or all of the operations performed by the service provider network 102, and/or any components and/or services included therein, may be performed by one or more computer devices 1000 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof.

As mentioned briefly above, the mass storage device 1014 can store an operating system utilized to control the operation of the computer 1000. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The mass storage device 1014 can store other system or application programs and data utilized by the computer 1000.

In one embodiment, the mass storage device 1014 or other computer-readable storage media is encoded with computer-executable instructions which, when loaded into the computer 1000, transform the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various processes described above with regard to FIGS. 6 and 7. The computer 1000 can also include computer-readable storage media having instructions stored thereupon for performing any of the other computer-implemented operations described herein.

The computer 1000 can also include one or more input/output controllers 1018 for receiving and processing input from a number of input devices, such as a keyboard, a mouse, a touchpad, a touch screen, an electronic stylus, or other type of input device. Similarly, an input/output controller 1018 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or might utilize an architecture completely different than that shown in FIG. 10.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
non-transitory computer-readable media storing computer-executable instructions that, when executed by the one or more processors, cause the system to:
receive a request to create a virtual controller instance, the virtual controller instance comprising a standardized unit of software for executing one or more applications in a service provider network, wherein receiving the request comprises receiving, via an interface, a selection of an application from a list of applications, and one or more characteristics of a runtime image for executing the application, wherein, the application is configured to execute on a machine controller that controls an electromechanical system of a specific machine that resides in a facility, wherein the list of applications is associated with a plurality of application images maintained in an application registry, and wherein the plurality of application images include an application image of the application;
access, without user intervention, metadata describing characteristics of a plurality of runtime images to identify, from a runtime registry that maintains the plurality of runtime images, a runtime image that satisfies the one or more characteristics in the request as a target runtime image for the application, wherein the metadata accessed to identify the runtime image as the target runtime image is linked to the application image;
retrieve, based on the request, the runtime image from the runtime registry, the runtime image comprising a binary executable program;
create a virtual controller instance using the runtime image in the service provider network; and
execute the application on the virtual controller instance, wherein executing the application further comprises:
providing data as input to the application to elicit a response from the application;
processing the input on the virtual controller instance and outputting the response from the application;
validating, based on the response from the application, the application as being ready for deployment by comparing the response from the application with a predetermined expected response, and thereby resulting in a validated application;
providing, via the interface, an element that, upon selection, deploys the validated application on at least the machine controller to control the electromechanical system of the specific machine over the service provider network;
receiving an indication that the element has been selected;
deploying, over the service provider network and based on the indication, the validated application on the machine controller; and
controlling the electromechanical system of the specific machine using the validated application.

2. The system of claim 1, wherein receiving the request comprises receiving, from a user and via the interface, the selection of the application.

3. The system of claim 1, wherein the data provided as the input to the application represents fault data associated with a fault condition of a machine or a sensor within the facility.

4. The system of claim 1, wherein receiving the request comprises receiving, from at least one of a user or a computer program, a value for a characteristic of the runtime image, the characteristic comprising at least one of a vendor identifier, a processor speed, an amount of storage, or a type of communications interface.

5. The system of claim 4, wherein:
the creating of the virtual controller instance comprises:
identifying, from the runtime registry, a qualifying runtime image that satisfies the value for the characteristic; and
creating the virtual controller instance based on the qualifying runtime image.

6. The system of claim 1, wherein the deploying of the validated application comprises deploying, over the service provider network, the validated application on a plurality of machine controllers that are a same type of machine controller, the plurality of machine controllers residing in multiple different facilities.

7. The system of claim 1, wherein:
the application executing on the virtual controller instance is linked to an external system; and
the data sent as the input to the application is received from the external system.

8. A method comprising:
receiving, by one or more computing devices of a service provider network, a request to create a virtual controller instance, wherein receiving the request comprises receiving, via an interface, a selection of an application from a list of applications, and one or more characteristics of a runtime image for executing the application, wherein, the application configured to execute on a machine controller that controls an electromechanical system of a specific machine that resides in a facility, wherein the list of applications associated is with a plurality of application images maintained in an application registry, and wherein the plurality of application images include an application image of the application;
accessing, without user intervention, metadata describing characteristics of a plurality of runtime images to identify, from a runtime registry that maintains the plurality of runtime images, a runtime image that satisfies the one or more characteristics in the request as a target runtime image for the application, wherein the metadata accessed to identify the runtime image as the target runtime image is linked to the application image;
creating, by the one or more computing devices and based at least in part on the target runtime image, the virtual controller instance in the service provider network; and
executing, by the one or more computing devices, the application on the virtual controller instance, wherein executing the application further comprises:
sending, by the one or more computing devices, data as input to the application to elicit a response from the application;
processing the input on the virtual controller instance and outputting the response from the application;
validating, based on the response from the application, the application as being ready for deployment by comparing the response from the application with a predetermined expected response, and thereby resulting in a validated application;
providing, via the interface, an element that, upon selection, deploys the validated application on at least the machine controller to control the electromechanical system of the specific machine over the service provider network;

receiving an indication that the element has been selected;

deploying, over the service provider network and based at least in part on the indication, the validated application on the machine controller; and controlling the electromechanical system of the specific machine using the validated application.

9. The method of claim 8, wherein the receiving of the request comprises receiving, from a user, the selection of the application.

10. The method of claim 8, wherein:

the receiving of the request comprises receiving, from at least one of a user or a computer program, a value for a characteristic of the runtime image, the characteristic comprising at least one of a vendor identifier, a processor speed, an amount of storage, or a type of communications interface; and the creating of the virtual controller instance comprises:

identifying, from the runtime registry, a qualifying runtime image that satisfies the value for the characteristic; and creating the virtual controller instance based at least in part on the qualifying runtime image.

11. The method of claim 8, wherein the deploying the validated application comprises deploying, over the service provider network, the validated application on a plurality of machine controllers that are a same type of machine controller, the plurality of machine controllers residing in multiple different facilities.

12. The method of claim 8, wherein:

the application executing on the virtual controller instance is linked to an external system; and the data sent as the input to the application is received from the external system.

13. The method of claim 12, wherein the external system comprises a warehouse management system.

14. The method of claim 8, wherein the data sent as the input to application the represents fault data associated with a fault condition of a machine or a sensor within the facility.

15. A system comprising:

one or more processors; and non-transitory computer-readable media storing computer-executable instructions that, when executed by the one or more processors, cause the system to:

receive a request to create a virtual controller instance, wherein receiving the request comprises receiving, via an interface, a selection of an application from a list of applications, and one or more characteristics of a runtime image for executing the application, wherein, the application is configured to execute on a machine controller that controls an electromechanical system of a specific machine that resides in a facility, wherein the list of applications is with a plurality of application images maintained in an application registry, and wherein the plurality of application images include an application image of the application;

accessing, without user intervention, metadata describing characteristics of a plurality of runtime images to identify, from a runtime registry that maintains a plurality of runtime images, a runtime image that satisfies the one or more characteristics in the request as a target runtime image for the application, wherein the metadata accessed to identify the runtime image as the target runtime image is linked to the application image;

create, based at least in part on the target runtime image, the virtual controller instance in a service provider network; and execute the application on the virtual controller instance, wherein executing the application further comprises:

sending data as input to the application to elicit one or more responses from the application;

processing the input on the virtual controller instance and outputting the response from the application;

validating, based at least in part on the one or more responses from the application, the application as being ready for deployment by comparing the response from the application with a predetermined expected response, and thereby resulting in a validated application;

executing on the machine controller to control the electromechanical system of the specific machine;

providing, via the interface, an element that, upon selection, deploys the validated application on at least the machine controller to control the electromechanical system of the specific machine over the service provider network;

receiving an indication that the element has been selected; and deploying, over the service provider network and based at least in part on the indication, the validated application on the machine controller; and controlling the electromechanical system of the specific machine using the validated application.

16. The system of claim 15, wherein receiving the request comprises receiving, from a user, the selection of the application.

17. The system of claim 15, wherein:

receiving the request comprises receiving, from at least one of a user or a computer program, a value for a characteristic of the runtime image, the characteristic comprising at least one of a vendor identifier, a processor speed, an amount of storage, or a type of communications interface; and creating the virtual controller instance comprises:

identifying, from the runtime registry, a qualifying runtime image that satisfies the value for the characteristic; and creating the virtual controller instance based at least in part on the qualifying runtime image.

18. The system of claim 15, wherein deploying the validated application comprises deploying, over the service provider network, the validated application on a plurality of machine controllers that are a same type of machine controller, the plurality of machine controllers residing in multiple different facilities.

19. The system of claim 15, wherein:

the application executing on the virtual controller instance is linked to an external system; and the data sent as the input to the application is received from the external system.

20. The system of claim 15, wherein the sending the data as the input to the application comprises sending field bus data as the input to the application, the field bus data simulating data that is communicated via one or more field buses of the machine controller.

* * * * *